United States Patent [19]

Fritsch et al.

[11] Patent Number: 5,086,159
[45] Date of Patent: Feb. 4, 1992

[54] STABILIZED COPOLYCARBONATE FROM DIHYDROXY DIPHENYL CYCLOALKANE

[75] Inventors: Karl-Herbert Fritsch, Bergisch Gladbach; Uwe Westeppe, Mettmann; Werner Nouvertné; Dieter Freitag, both of Krefeld, all of Fed. Rep. of Germany

[73] Assignee: Bayer Aktiengesellschaft, Leverkusen, Fed. Rep. of Germany

[21] Appl. No.: 568,460

[22] Filed: Aug. 15, 1990

[30] Foreign Application Priority Data

Aug. 25, 1989 [DE] Fed. Rep. of Germany ....... 3928155

[51] Int. Cl.$^5$ ............................................. C08G 64/06
[52] U.S. Cl. ..................................... 528/204; 528/171; 528/196
[58] Field of Search ................ 528/204, 196, 171

[56] References Cited

U.S. PATENT DOCUMENTS 4,554,309 11/1985 Mark et al. ................ 528/204

Primary Examiner—Harold D. Anderson
Attorney, Agent, or Firm—Joseph C. Gil; Aron Preis

[57] ABSTRACT

Copolycarbonates derived from known bisphenols and small quantities of dihydroxydiphenyl cycloalkanes corresponding to formula (I)

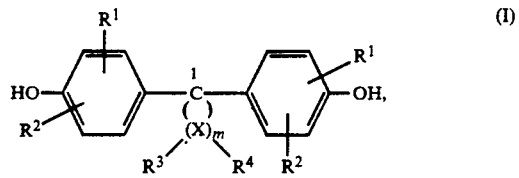

wherein
$R^1$ and $R^2$ denote, independently of one another, hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$-alkyl, in particular benzyl,
m denotes an integer with a value from 4 to 7, preferably 4 or 5,
$R^3$ and $R^4$, which are selected independently for each X, denote, independently of one another, hydrogen or $C_1$ to $C_6$ alkyl, and
X denotes carbon under the condition that $R^3$ and $R^4$ are both alkyl on at least one X atoms are disclosed. These copolycarbonates are characterized by their improved processing stability.

7 Claims, No Drawings

STABILIZED COPOLYCARBONATE FROM DIHYDROXY DIPHENYL CYCLOALKANE

This invention relates to copolycarbonates with improved processing stability. It relates in particular to copolycarbonates of known bisphenols and small quantities of dihydroxydiphenyl cycloalkanes corresponding to formula (I)

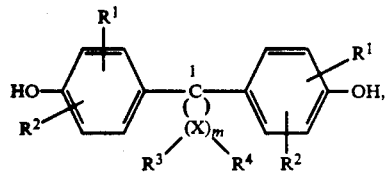

wherein $R^1$ and $R^2$ denote, independently of one another, hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$-alkyl, in particular benzyl, m denotes an integer with a value from 4 to 7, preferably 4 or 5, $R^3$ and $R^4$, which are individually selected for each X, denote, independently of one another, hydrogen or $C_1$ to $C_6$ alkyl, and X denotes carbon, under the condition that $R^3$ and $R^4$ are both alkyl on at least one X atom.

$R^3$ and $R^4$ are both alkyl on preferably 1 or 2 X atoms, especially on only one X atom. The preferred alkyl group is methyl. The X atoms in the α position to the diphenyl substituted carbon atom, (C-1) are preferably not dialkyl 10 substituted but alkyl disubstitution is preferred in the β position to C-1. Diphenols in which the X atom in the β position is alkyl disubstituted and the X atom in the β' position is monoalkyl substituted are particularly preferred. The invention in particular relates to dihydroxydiphenyl cycloalkanes having 5 or 6 ring carbon atoms in the cycloaliphatic group (m=4 or 5 in formula (I)), for example, the diphenols corresponding to the following formulae:

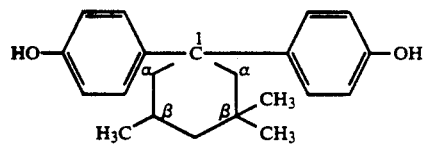

and

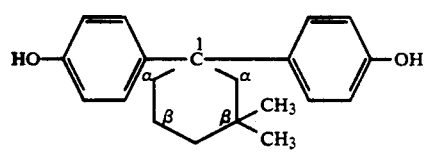

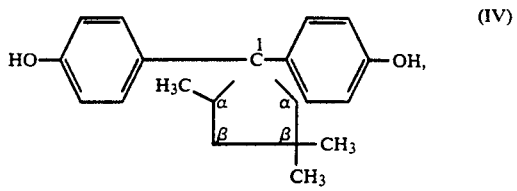

1,1-Bis-(4-hydroxyphenyl)-3,3,5-trimethylcyclohexane (see formula II) is particularly preferred.

Dihydroxydiphenyl cycloalkanes corresponding to formula (I) and processes for their preparation are described in the earlier German Offenlegungsschrift 3 832 396. They may be prepared in known manner by the condensation of phenols corresponding to formula (V)

and ketones corresponding to formula (VI)

in which formulae (V) and (VI), X, $R^1$, $R^2$, $R^3$, $R^4$ and m have the meanings indicated for formula (I). The phenols of formula (V) are known or are obtainable by known processes (for cresols and xylenols, for example, see Ullmanns Encyklopädie der technischen Chemie, 4th revised and enlarged edition, Volume 15, pages 61 to 77, publishers ChemieWeinheim, New York, 1978; for chlorophenols, see Ullmanns Enclyklopädie der technischen Chemie, 4th Edition, Verlag Chemie, 1975, Volume 9, pages 573-582; and for alkylphenols see Ullmanns Encyklopädie der technischen Chemie, 4th Edition, Verlag Chemie, 1979, Volume 18, pages 191 to 214).

The following are examples of suitable phenols corresponding to formula (V): phenol, o-cresol, m-cresol, 2,6-dimethylphenol, 2-chlorophenol, 3-chlorophenol, 2,6-dichlorophenol, diphenylphenol and p-benzylphenol.

The ketones corresponding to formula (VI) are known (see, for example, Beilsteins Handbuch der Organischen Chemie, Volume 7, 4th Edition, Springer-Verlag, Berlin, 1025 and the corresponding Supplementary Volumes 1 to 4; and J. Am. Chem. Soc. Volume 79, (1957), pages 1488-1492; U.S. Pat. Nos. 2 692 289; Allen et al., J. Chem. Soc., (1959), 2186-2192; J. Org. Chem., Volume 38, (1973), pages 4431-4435; and J. Am. Chem. Soc. 87, (1965), pages 1353-1364. A general method of preparation for ketones corresponding to formula (VI) is described, for example, in "Organikum", 15th Edition, 1977, VEB Deutscher Verlag der Wissenschaften, Berlin, e.g. on page 698.

The following are examples of known ketones corresponding to formula (VI): 3,3-dimethyl cyclopentanone, 3,3-dimethyl cyclohexanone, 4,4-dimethyl cyclohexanone, 3-ethyl-3-methyl cyclopentanone, 2,3,3-trimethyl cyclopentanone, 3,3,4-trimethylcyclopentanone, 3,3-dimethyl cycloheptanone, 4,4-dimethyl cycloheptanone, 3-ethyl-3-methyl cyclohexanone, 4-ethyl-4-methyl cyclohexanone, 2,3,3-trimethyl cyclohexanone, 2,4,4-trimethyl cyclohexanone, 3,3,4-trimethyl cyclohexanone, 3,3,5-trimethyl cyclohexanone, 3,4,4-trimethyl cyclohexanone, 2,3,3,4-tetramethyl cyclopentanone, 3,3,4,4-tetramethyl cyclopentanone, 3,3,5-trimethyl cycloheptanone, 3,5,5-trimethyl cycloheptanone, 5-ethyl-2,5-dimethyl cycloheptanone, 2,3,3,5-tetramethyl cycloheptanone, 2,3,5,5-tetramethyl cycloheptanone, 3,3,5,5-tetramethyl cycloheptanone, 4-ethyl-2,3,4-trimethyl cyclopentanone, 2-ethyl-3,5,5-trimethyl cyclohexanone, 3-ethyl-3,5,5-trimethyl cyclohexanone, 3-ethyl-4-isopropyl-3-methyl cyclopentanone, 4-sec.-butyl-3,3-dimethyl cyclopentanone, 2-isopropyl-3,3,4-trimethyl cyclopentanone, 3-ethyl-4-isopropyl-3-methyl cyclohexanone, 4-ethyl-3-isopropyl-4-methyl cyclohexanone, 3-sec.-butyl-4,4-dimethyl cyclohexanone, 3-isopropyl-3,5,5-trimethyl cyclohexanone, 4-isopropyl-3,5,5-trimethyl cyclohexanone, 3,3,5-trimethyl-5-propyl cyclohexanone, 3,5,5-trimethyl-5-propyl cyclohexanone, 2-butyl-3,3,4-trimethyl cyclopentanone, 2-butyl-3,3,4-trimethyl cyclohexanone, 4-butyl-3,3,5-trimethyl cyclohexanone, 3-isohexyl-3-methyl cyclohexanone, 5-ethyl-2,4-diisopropyl-5-methyl cyclohexanone, and 3,3,8-trimethyl cyclooctanone.

The following are examples of preferred ketones:

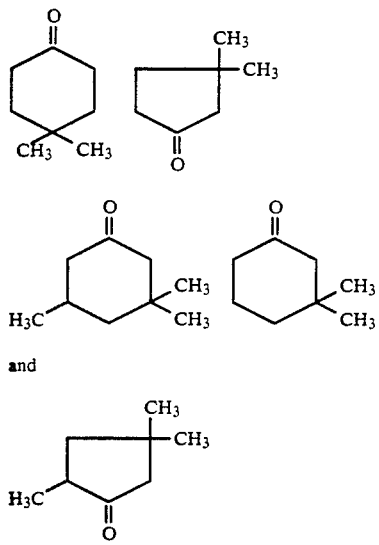

and

From 2 to 10 mol, preferably 2.5 to 6 mol of phenol (V) are generally used per mol of ketone (VI) for the prepration of the bisphenols. The reaction times are preferably from 1 to 100 hours. The temperatures employed are generally from −30° C. to 300° C., preferably from −15° C. to 150° C., and the pressure is generally from 1 to 20 bar, preferably from 1 to 10 bar.

The condensation is generally carried out in the presence of acid catalysts, of which the following are examples: hydrogen chloride, hydrogen bromide, hydrogen fluoride, boron trifluoride, aluminium trichloride, zinc dichloride, titanium tetrachloride, tin tetrachloride, phosphorus halides, phosphorus pentoxide, phosphoric acid, concentrated hydrochloric acid, concentrated sulphuric acid and mixtures of acetic acid and acetic anhydride. Acid ion exchangers may also be used.

The reaction may be further accelerated by the addition of co-catalysts such as $C_1$ to $C_{18}$ alkyl mercaptans, hydrogen sulphide, thio phenols, thio acids or dialkyl sulphides in quantities of 0.01–0.2 Mol/Mol ketone, particularly 0.05–0.2 Mol/Mol Ketone Condensation may be carried out without solvents or in the presence of an inert solvent (e.g. an aliphatic or aromatic hydrocarbon or chlorinated hydrocarbon).

It is only when the catalyst does not also function as dehydrating agent that it is advisable to add a dehydrating agent for obtaining high yields.

Acetic anhydride, zeolites, polyphosphoric acid and phosphorus pentoxide are examples of suitable dehydrating agents.

The invention is based on the finding that the use of small quantities of dihydroxydiphenyl cycloalkanes corresponding to formula (I) as comonomers for the preparation of aromatic polycarbonates with diphenols improves the processing stability of the polymers.

The present invention thus relates to thermoplastic, aromatic polycarbonates having molecular weights Mw (weight average) of at least 8000, preferably from 10,000 to 250,000, especially from 16,000 to 90,000, obtained from diphenols corresponding to formula (VII) and from 0.01 to 1.99% (based on the total quantity of diphenols) of diphenols corresponding to formula (I).

Suitable diphenols of formula (VII)

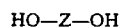

are those in which Z stands for an aromatic group having 6 to 30 carbon atoms, which group may contain 1 or more aromatic nuclei, may be substituted, and may contain aliphatic groups or cycloaliphatic groups other than those of formula (I) or heteroatoms as bridging members.

The following are examples of diphenols corresponding to formula (VII): hydroquinone, resorcinol, dihydroxydiphenyls, bis- (hyroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxyphenyl)diisopropyl benzenes and the derivatives of these compounds which are alkylated or halogenated in the nucleus.

These and other suitable diphenols corresponding to formula (VII) are described, for example, in U.S. Pat. Nos. 3 028 365, 2 999 835, 3 148 172, 3 275 601, 2 991 273, 3 271 367, 3 062 781, 2 970 131 and 2 999 846, in DE-OS 1 570 703, 2 063 050, 2 063 052 and 2 211 0956, in FR-PS 1 561 518 and in "H. Schnell, Chemistry and Physics of Polycarbonates, Interscience Publishers, New York, 1964".

The following are preferred examples of the "other diphenols": 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, αα'-bis-(4-hydroxyphenyl)-p-diisopropyl benzene, 2,2-bis-(3-methyl-4-hydroxyphenyl)-propane, 2,2-bis-(3-chloro-4 TM hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4- hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

The following are particularly preferred diphenols of formula (VII): 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-bis-(4-hydroxyphenyl)-propane is particularly preferred.

The diphenols of formula (VII) may be used singly or as mixtures.

The molar ratio of dihydroxydiphenyl cycloalkanes corresponding to formula (I) to diphenols corresponding to formula (VII) is in the range of from 1.99 mol% (I):98.01 mol% (VII) to 0.01 mol% (I):99.99 mol% (VII) and is preferably from 1.8 mol% (I):98.2 mol% (VII) to 0.1 mol% (I):99.9 mol% (VII), especially from 1.7 mol% (I):98.3 mol% (VII) to 0.2 mol% (I): 99.5 mol% (VII), most preferably from 1.5 mol% (I):98.5 mol% (VII) to 0.4 mol% (I):99.6 mol% (VII).

The present invention in particular relates to thermoplastic, aromatic polycarbonates having molecular weights Mw (weight average) of at least 8000, preferably from 10,000 to 250,000, most preferably from 16,000 to 90,000, containing bifunctional structural units corresponding to formula (Ia)

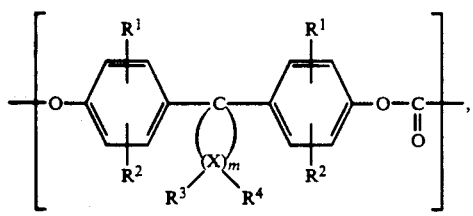

wherein X, $R^1$, $R^2$, $R^3$, $R^4$ and m have the meanings indicated for formula (I), in quantities of from 0.01 mol% to 1.99 mol%, preferably from 0.1 mol% to 1.8 mol%, more preferably from 0.2 mol% to 1.7 mol% and most preferably from 0.4 mol% to 1.5 mol%, based on the total quantity of carbonate structural units.

The copolycarbonates according to the invention contain carbonate structural units corresponding to formula (VIIa)

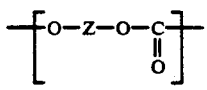

wherein Z has the meaning indicated above in the quantities required to make the total up to 100 mol%.

In the preferred copolycarbonates m=4 or 5 in the structural units of formula (Ia), especially those copolycarbonates containing structural units corresponding to formula (Ic)

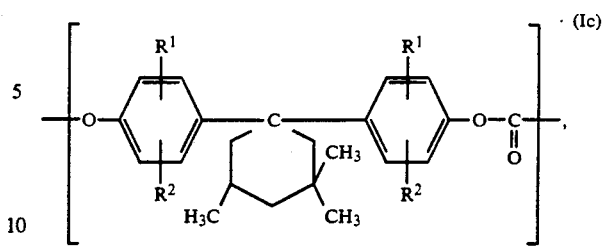

wherein $R^1$ and $R^2$ have the meanings indicated for formula (Ia) but most preferably stand for hydrogen.

The present invention also relates to the use of small quantities of the dihydroxydiphenyl cycloalkanes of formula (I) for the preparation of high molecular weight thermoplastic, aromatic copolycarbonates with improved processing stability.

The high molecular weight copolycarbonates obtained from dihydroxydiphenyl cycloalkanes of formula (I) and diphenols of formula (VII) may be prepared by known processes for the preparation of polycarbonates. The various diphenol groups may be arranged at random or blockwise in the polymer.

The present invention thus also relates to a process for the preparation of high molecular weight thermoplastic, aromatic copolycarbonates from diphenols, dihydroxydiphenyl cycloalkanes of formula (I), optionally chain terminators and optionally branching agents in known manner, preferably by phase interface polycondensation, in which dihydroxydiphenyl cycloalkanes of formula (I) are incorporated by condensation in quantities of from 0.01 mol% to 1.99 mol%, preferably from 0.1 mol% to 1.8 mol%, more preferably from 0.2 mol% to 1.7 mol% and most preferably from 0.4 mol% to 1.5 mol%, based on the total quantity of diphenols.

The chain terminators for regulating the molecular weight may be conventional monofunctional chain terminators used at the usual concentrations. Phenol, tert.-butyl phenols and other alkyl-$C_1$-$C_7$-substituted phenols are examples of suitable compounds for this purpose. Small quantities of phenols corresponding to formula (VIII)

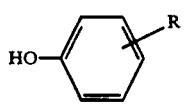

wherein R stands for a branched $C_8$ and/or $C_9$ alkyl group are particularly suitable.

In the alkyl group R, the proportion of protons in the $CH_3$ groups is preferably from 47 to 89% and the proportion of protons in the CH and $CH_2$ groups is preferably from 53 to 11%. The alkyl group R is preferably situated in the ortho and/or para position to the OH group, and the proportion of ortho compounds is most preferably not more than 20% by weight. The chain terminators are generally used in quantities of from 0.5 to 10 mol%, preferably from 1.5 to 8 mol%, based on the total quantity of diphenols.

The branching agents used may be small quantities, preferably from 0.05 to 2.0 mol% (based on the quantity of diphenols used) of trifunctional or higher than trifunctional compounds, in particular compounds containing 3 or more phenolic hydroxyl groups. The following are examples of suitable branching agents containing 3 or more than 3 phenolic hydroxyl groups: phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxy-phenyl)-ethane, tri-(4-hydroxyphenyl)-phenyl methane, 2,2-bis-(4,4-bis-(4-hydroxyphenyl)-cyclohexyl)-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenyl-isopropyl)phenoxy)-methane and 1,4-bis-((4',4''-dihydroxytriphenyl)methyl)-benzene.

The following are further examples of suitable trifunctional compounds: 2,4-dihydroxy benzoic acid, trimesic acid, cyanuric chloride and 3,3-bis-(3-methyl-4-hydroxyphenyl)-2-oxo-2,3-dihydroindole.

The copolycarbonates according to the invention are advantageously produced by phase interface condensation in known manner (see H. Schnell, "Chemistry and Physics of Polycarbonates", Polymer Reviews, Volume IX, pages 33 et seq., Interscience Publishers, 1964). According to the invention, this condensation is carried out with small quantities of compounds of formula (I) in addition to the compounds of formula (VII). Chain terminators, e.g. of formula (VII), may be added to regulate the molecular weight. The reaction is then carried out with phosgene according to the rules of phase interface polycondensation in the presence of an inert organic phase, preferably one which dissolves polycarbonates. The reaction temperature is from 0° C. to 40° C.

The 0.05 to 2 mol% of branching agents optionally used may either be introduced into the aqueous alkaline phase together with the diphenols or dissolved in the organic solvent before phosgenation is carried out.

In addition to the diphenols of formula (I) and those of formula (VII), there may also be included the mono and/or bischloro carbonic acid esters of these diphenols, these esters being added as solutions in organic solvents. When chlorocarbonic acid esters are added, the quantity of phosgene may be reduced by a corresponding amount.

Examples of suitable organic solvents for the chain terminators and the optional branching agents and chlorocarbonic acid esters include methylene chloride, chlorobenzene, acetone, acetonitrile and mixtures of these solvents, in particular mixtures of methylene chloride and chlorobenzene. The chain terminators and branching agents may, if desired, be dissolved in the same solvent.

The organic phase used for the phase interface polycondensation may be, for example, methylene chloride, chlorobenzene or mixtures of methylene chloride and chlorobenzene. Aqueous NaOH solution, for example, may be used as the aqueous alkaline phase.

The preparation of the copolycarbonates according to the invention by phase interface polycondensation may be catalysed in the usual manner, e.g. with tertiary amines, in particular tertiary aliphatic amines such as tributylamine or triethylamine. The catalysts may be used in quantities of from 0.05 to 10 mol%, based on the number of mols of diphenols used. The catalysts may be added before, during or after phosgenation.

The high molecular weight thermoplastic, aromatic copolycarbonates according to the invention may also be prepared by the known homogeneous phase process, the so called pyridine process, or by the known solvent free transesterification process, using, for example, diphenyl carbonate instead of phosgene. The copolycarbonates according to the invention are in these cases again isolated in known manner.

The copolycarbonates obtainable according to the invention may be isolated in known manner by separating the organic phase obtained from the phase interface polycondensation, washing it until neutral and free from electrolytes and then isolating the polymer as a granulate, for example by means of an evaporation extruder.

The conventional additives for thermoplastic polycarbonates, such as stabilizers, mould release agents, pigments, flame retardants, antistatic agents, fillers and reinforcing substances, may be added in the usual quantities to the copolycarbonates according to the invention before or during processing of the latter.

Carbon black, kieselguhr, kaolin, clay, $CaF_2$, $CaCO_3$, aluminium oxides, glass fibres and inorganic pigments are examples of substances which may be used both as fillers and as nucleating agents while glycerol stearates, pentaerythritoltetrastearate and trimethylolpropene tristearate, for example, may be used as mould parting agents, The copolycarbonates according to the invention may be worked up into moulded products, for example by extruding the polycarbonates in the form of granulates after they have been isolated in known manner and working up the granulate into various articles by injection moulding in known manner, optionally after addition of the above mentioned additives.

The polycarbonates according to the invention may be used as moulded products wherever the polycarbonates hitherto known have been used in this form, e.g. in the electrical industry and in the building industry for coverings and glazing, particularly when good processing properties and improved intrinsic colours are required.

In the following Examples 2 to 4, the relative viscosity is determined on a 0.5% by weight solution of the polycarbonate in $CH_2Cl_2$.

EXAMPLE 1

Preparation of
1,1-bis-(4-hydroxyphenyl)-3,3,5-trimethyl cyclohexane 7.5 mol (705 g) of phenol and 0.15 mol (30.3 g) of dodecyl thiol are introduced into a 1 litre round bottomed flask equipped with stirrer, dropping funnel, thermometer, reflux condenser and gas inlet tube and the reaction mixture is saturated with anhydrous HCl gas at 28° to 30° C. A solution of 1.5 mol (210 g) of dihydroisophorone (3,3,5-trimethyl-cyclohexan -1-one) and 1.5 mol (151 g) of phenol is added dropwise to this solution within 3 hours while HCl gas continues to be passed through the reaction solution and the addition of HCl gas is continued for a further 5 hours after dropwise addition of the above mentioned solution has been completed. The reaction mixture is left to react at room temperature for 8 hours. Excess phenol is then removed by steam distillation. The residue is extracted hot, twice with petroleum ether (60–90) and once with methylene chloride, and filtered off.

Yield: 370 g, Melting point: 205° to 207° C.

EXAMPLE 2

Preparation of a copolycarbonate 225.72 g (0.99 mol) of bisphenol A and 3.10 g (0.01 mol) of the diphenol of Example 1, 336 g (6 mol) of KOH and 5600 g of water are dissolved with stirring under an inert gas. A solution of 8.2 g (4 mol%) of isooctyl phenol in 5600 g of methylene chloride is then added. 198 g (2 mol) of phosgene are introduced into the thoroughly stirred solution at pH 13 to 14 and at 21° to 25° C. 1 ml of ethylpyridine is then added and stirring is continued for a further 45 minutes.

The aqueous phase, which is free from bisphenolate, is separated off and the organic phase is washed with water until neutral after acidification with phosphoric acid and is freed from solvent. The polycarbonate is found to have a relative solution viscosity of 1.279.

EXAMPLE 3

Preparation of a copolycarbonate 223.46 g (0.9801 mol) of bisphenol A and 6.17 g (0.0199 mol) of the diphenol from Example 1, 336g (6 mol) of KOH and 5600 g of water are dissolved with stirring under an inert gas. A solution of 8.2 g (4 mol%) of isooctyl phenol in 5600 g of methylene chloride is then added. 198 g (2 mol) of phosgene are introduced into the stirred solution at pH 13 to 14 and at 21° to 25° C. 1 ml of ethylpyridine is then added and stirring is continued for a further 45 minutes. The aqueous phase, which is free from bisphenolate, is separated off and the organic phase is washed with water until neutral after acidification with phosphoric acid and is freed from solvent. The polycarbonate has a relative solution viscosity of 1.282.

EXAMPLE 4

Comparison example

Polycarbonate of bisphenol A having a relative solution viscosity of 1.28.

Assessment:

Plates measuring 60×40×4 mm were prepared from the polycarbonates in an injection moulding machine at mass temperatures of 360° C. and 390° C. Transmission measurements were carried out on these plates at monochromatic sample exposure using a Diano Match Scan spectral photometer with measurement geometry O/d in accordance with DIN 5033 for standard light type C/2. The yellowness index according to ASTM D-1925 was calculated from the standard colour values X, Y, Z determined. The results are shown in Table 1.

| Sample | Injection Moulding Temperature (°C.) | Yellowness Index |
|---|---|---|
| Copolycarbonate Example 2 | 360 | 0.57 |
| Copolycarbonate Example 2 | 390 | 0.75 |
| Copolycarbonate Example 3 | 360 | 0.51 |
| Copolycarbonate Example 3 | 390 | 0.71 |
| Comparison Example 4 | 360 | 0.60 |
| Comparison Example 4 | 390 | 0.77 |

The copolycarbonates according to the invention have a lower yellowness index.

We claim:

1. A thermoplastic molding composition comprising an aromatic copolycarbonate resin having a weight average molecular weight of at least 8000 prepared by reacting a member selected from the group consisting of phosgene and carbonyl halide with (i) at least one first diphenol corresponding to

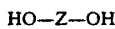

wherein Z denotes an aromatic group having 6 to 30 carbon atoms, and from (ii) at least one dihydroxy diphenyl cycloalkane corresponding to

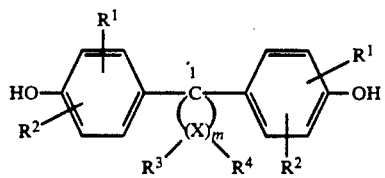

wherein $R^1$ and $R^2$ independently of one another denote a member selected from the group consisting of a hydrogen atom, a halogen atom, $C_1-C_8$ alkyl, $C_5-C_6$ cycloalkyl, $C_6-C_{10}$ aryl and $C_7-C_{12}$ aralkyl radicals, and m denotes an integer from 4 to 7, and $R^3$ and $R^4$, are individually selected for each X and independently of one another denote a hydrogen atom or a $C_1-C_6$ alkyl radical, and X denotes carbon, wherein on at least one X atom, both $R^3$ and $R^4$ denote an alkyl radical and wherein said dihydroxy diphenyl cycloalkane is present in an amount of 0.01 to 1.99% relative to the total molar amount of said first diphenol and said dihydroxy diphenyl cycloalkane, wherein said Z contains no cycloaliphatic groups of said (ii).

2. The composition of claim 1 wherein said dihydroxydiphenyl cycloalkane is present in an amount of from 0.1 to 1.5%.

3. The composition of claim 2 wherein said m is 4 or 5.

4. The composition of claim 1 wherein said second diphenol corresponds to

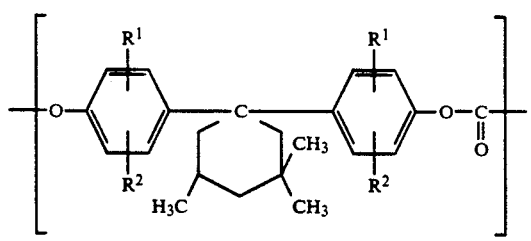

5. The composition of claim 4 wherein said $R^1$ and $R^2$ denote a hydrogen atom.

6. A thermoplastic molding composition comprising an aromatic copolycarbonate resin having a weight average molecular weight of at least 8000 prepared by reacting a member selected from the group consisting of phosgene and carbonyl halide with (i) at least one first diphenol corresponding to

wherein Z denotes an aromatic group having 6 to 30 carbon atoms, and from (ii) at least one dihydroxydiphenyl cycloalkane corresponding to

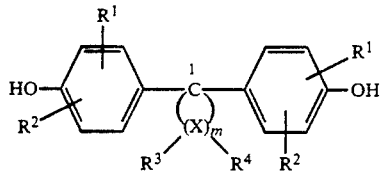

wherein
- $R^1$ and $R^2$ independently of one another denote a member selected from the group consisting of a hydrogen atom, a halogen atom, $C_1$-$C_8$ alkyl, $C_5$-$C_6$ cycloalkyl, $C_6$-$C_{10}$ aryl and $C_7$-$C_{12}$ aralkyl radicals, and
- m denotes 4 or 5, and
- $R^3$ and $R^4$ are individually selected for each X and independently of one another denote a hydrogen atom or a $C_1$-$C_6$ alkyl radical, and
- X denotes carbon, wherein on at least one X atom, both $R^3$ and $R^4$ denote an alkyl radical and wherein said dihydroxydiphenyl cycloalkane is present in an amount of 0.01 to 1.99% relative to the total molar amount of said first diphenol and said dihydroxydiphenyl cycloalkane, wherein said Z contains no cycloaliphatic groups of said (ii).

7. A thermoplastic molding composition comprising an aromatic copolycarbonate resin having a weight average molecular weight of at least 8000 prepared by reacting phosgene with
   (i) at least one first diphenol selected from the group consisting of
   2,2-bis-(4-hydroxyphenyl)-propane
   2,2-bis-(3,5-dimethyl-4-hyroxyphenyl)-propane,
   2,2-bis-(3,5-dichloro-4-hydroxyphenyl)-propane,
   2,2-bis-(3,5-dibromo-4-hydroxyphenyl)-propane and
   1,1-bis-(4-hydroxyphenyl)-cyclohexane, and with
   (ii) at least one dihydroxydiphenyl cycloalkane selected from the group consisting of

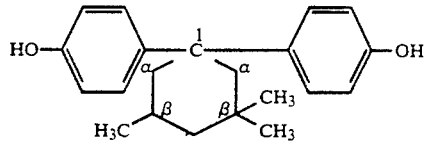

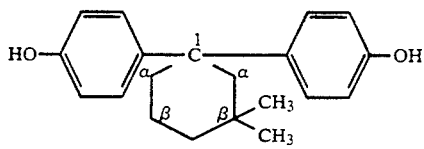

and

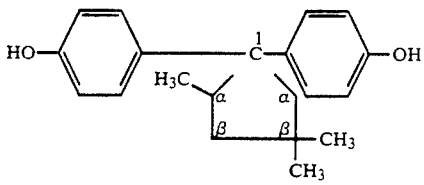

wherein said dihydroxydiphenyl cycloalkane is present in an amount of 0.01 to 1.99% relative to the total molar amount of said first diphenol and said dihydroxydiphenyl cycloalkane.

* * * * *